UNITED STATES PATENT OFFICE.

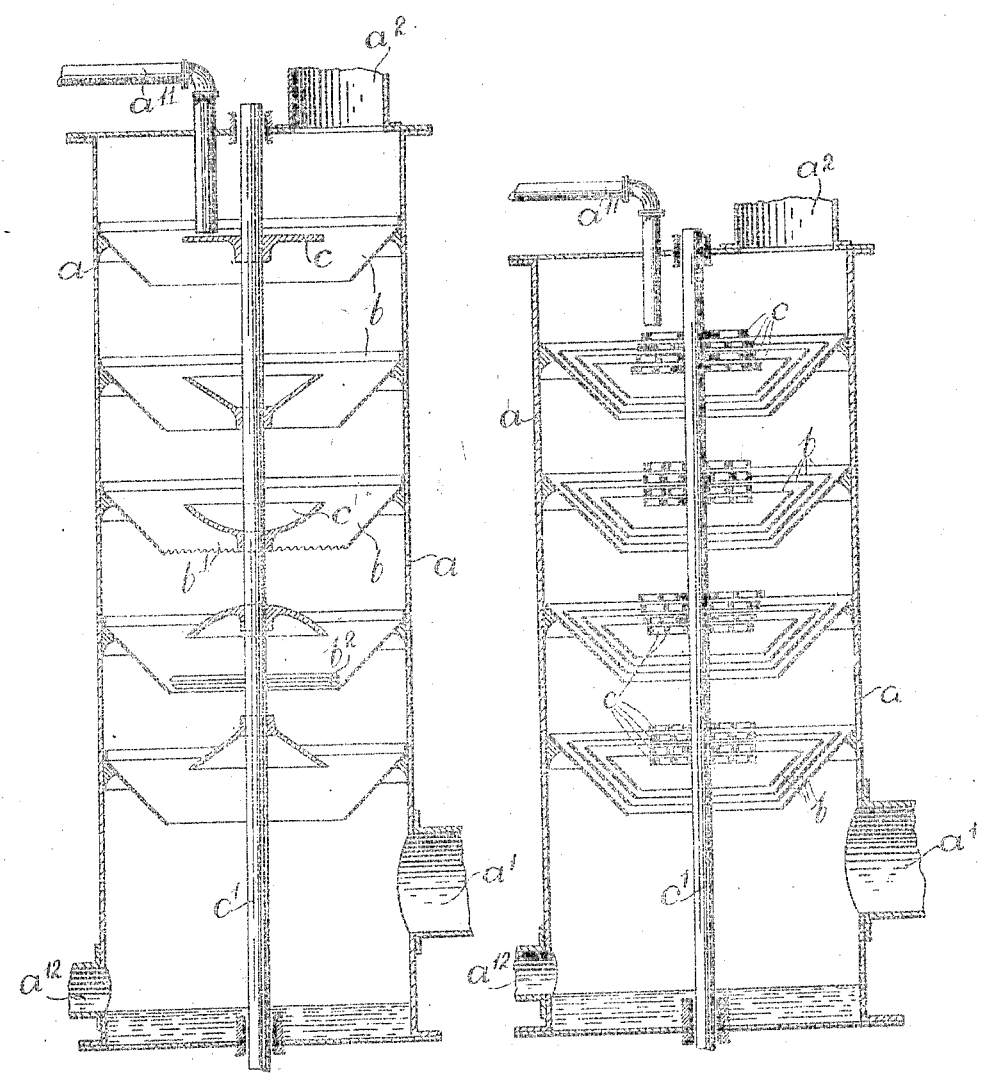

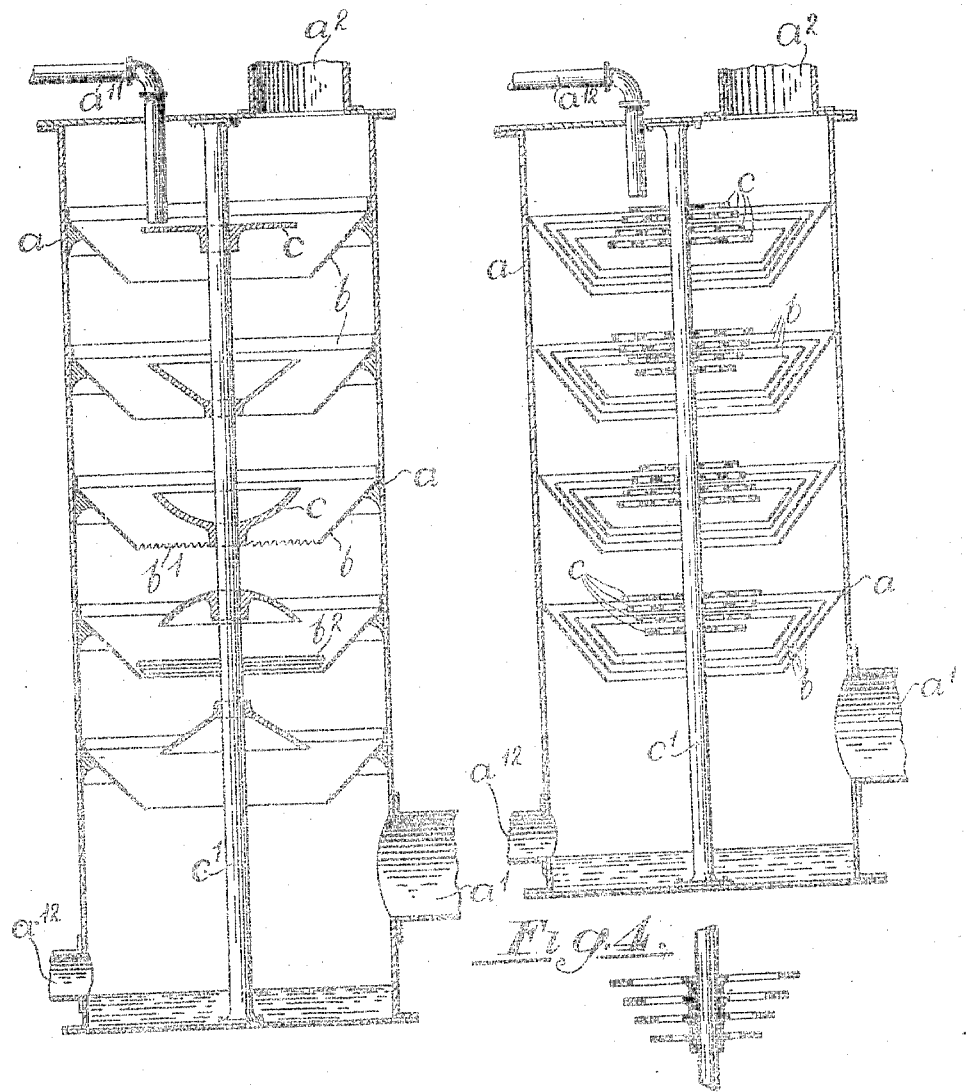

ARTHUR HENRY LYMN, OF WESTMINSTER, ENGLAND.

GAS-WASHER.

1,081,241.  Specification of Letters Patent.  Patented Dec. 9, 1913.

Application filed May 1, 1913. Serial No. 764,947.

*To all whom it may concern:*

Be it known that I, ARTHUR HENRY LYMN, a subject of the King of Great Britain and Ireland, residing at Westminster, England, have invented certain new and useful Improvements in Gas-Washers, of which the following is a specification.

The present invention relates to a gas washer, by which term is meant an apparatus for washing gases or vapors, such apparatus being of the kind comprising a vessel or tower wherein the washing liquid passes downward while the gases or vapors pass upward.

It is to be understood that the word "gases" wherever used hereinafter, whether in the specification or in the claims, is intended to include also vapors, the said apparatus serving for the washing of either gases or of vapors of any kind that is capable of being washed in this way.

The invention is also intended for the removal of any kind of impurities that are capable of being removed by such washing, it being immaterial for the purpose of my said invention whether such impurities are soluble in the washing liquid or whether they are insoluble therein.

According to the said invention the washing tower or vessel is provided in its interior alternately with liquid-collecting devices and with liquid-distributing devices, which latter coöperate with said collecting devices to cause or enable the upward current of gas by its momentum to throw and break up the stream of liquid and to effect thereby a thorough atomization of the liquid so that a very effective washing of the gases will take place during the passage of the liquid between the collecting and guiding devices and the distributing devices.

The invention will now be described more fully with reference to various embodiments thereof shown by way of example in the accompanying drawings in which:—

Figure 1 is a vertical sectional view of one form of apparatus having a rotary distributing device; Fig. 2 is a similar view of a modified form of apparatus also having a rotary distributing device; Fig. 3 is a similar view of a form of apparatus having fixed distributing devices; Fig. 4 shows a further modified form also having a fixed distributing device; and Fig. 5 shows a modified detail applicable to any of the forms of the apparatus.

In the said drawings:—$a$ indicates the tower, $b$ $b$ indicate generally the liquid collecting devices, and $c$ $c$ the liquid distributing devices.

In the various embodiments selected for illustration the tower $a$ comprises a cylindrical structure having a gas inlet $a'$ and a gas outlet $a^2$ at the top; a liquid inlet $a''$ at the top and a liquid outlet or overflow $a'^2$ near the bottom below the level of the gas inlet $a'$.

The liquid collecting devices comprise in the form shown fixed inverted truncated cones or funnels $b$ secured to the cylindrical wall of the tower $a$ at suitable intervals one below the other. The distributing devices employed will hereinafter be termed "disks", this term being intended herein to include not only disks properly so-called, but also devices of a character other than plane, such as cone-shaped, saucer-shaped, mushroom-shaped or the like. Any of these shapes may be employed alone or together in the same apparatus; and it will be seen that in the illustrated embodiments a considerable variety of distributing devices are exemplified. These disks, so-called, are arranged alternately to the collecting devices; that is to say, the liquid passes from a collecting device to the next distributing device and thence to the next collecting device, and so on.

In the form shown in Fig. 1, as well as that shown in Fig. 2, the distributing devices $c$ are mounted upon a central rotating shaft or spindle $c'$ which may or may not be rotated during the process of washing the gases; in the form shown in Figs. 3 and 4 the disks $c$ are also mounted upon a central support $c'$ but such support is fixed and may be of any convenient kind. The disk $c$ may be either imperforate or may be provided with small or with large perforations as shown in Figs. 2 and 4 respectively; or, if desired, they may be annular or of spider form as shown in Fig. 5. Moreover the diameters of said disks relatively to the diameters of the funnels $b$ may be as desired; in Figs. 1 and 2 the disks are smaller in diameter than the bottom edges of the funnels $b$; in Fig. 2 they are shown arranged in sets or groups, the funnels $b$ being also arranged in sets or "nested" with the smallest funnel of each nest somewhat larger in diameter at its bottom edge than the diameters of the smaller of the disks. Where the disks are arranged in groups, those of each group may progressively increase or diminish in diameter according to the order in which the group is arranged, or they may be of uniform or irregular diameter.

The invention is not limited to the form, size, or mode of arrangement of the disks, but such disks may be so disposed relatively to the funnels that the liquid as it flows from the funnels toward the distributing devices tends to assume the form of thin films or sheets of as large superficial area as is conveniently possible, and that the momentum of the upwardly flowing gas will break up these films or sheets in such a manner as to effect a thorough atomization.

In cases where the disks are carried by a revolving shaft as shown in Figs. 1 and 2, the breaking up of the liquid will be assisted by centrifugal forces, but this is not in all cases necessary because essentially the breaking up is effected not so much by centrifugal force as by the momentum of the gas. In order further to assist such breaking up of the stream of liquid from the collecting devices the latter may if desired be serrated, scalloped, or otherwise formed at their lower edges, as shown at $b'$ in Figs. 1 and 3, or they may have an auxiliary means such as ridged shaped rings, $b^2$, or the like.

In practice the collecting cones, each of which collects the wash liquid from the preceding distributing disk, are so dimensioned, and so arranged relatively to the distributing disks, that the lower diameters of the collecting cones are not substantially smaller than the outer diameter of the respective distributing disks and that at the same time the said devices are so spaced vertically that there is during the passage of the liquid from the collecting cones to the distributing disks, and vice versa, sufficient space for said liquid to offer a large area to the impact of the upwardly passing gas so that said liquid will be well atomized by the momentum of the gas and will be thrown outward or inward in its atomized condition. With this form of arrangement the current of gas is not unduly throttled and thus less power is requisite for passing the gas through the tower; moreover effective washing towers for large quantities of gas can be built much more easily and cheaply than heretofore has been the case.

In the examples selected for illustration the collecting cones *b* and distributing disks *e* are of such relative sizes that the liquid does not directly fall from the collecting cones onto the distributing disks; moreover, the liquid leaves said collecting cones in one or more relatively thin layers or films so that the gas passing from the apparatus is enabled thoroughly to atomize the liquid and throw it in an atomized condition toward the axis of the apparatus and over the whole surface of the distributing disks *e*.

What I claim as my invention and desire to secure by Letters Patent is:—

1. In a gas washer, the combination of a container-vessel or casing having at its upper end a water inlet and a gas outlet and having at its lower end a water outlet and a gas inlet, a plurality of inverted truncated cones fixed at different levels within said container vessel or casing, and disks arranged coaxially and alternately with said cones, each of said disks being of a diameter not substantially greater than the lower or smaller diameter of the respective cone immediately above it and being located at such a distance below said respective cone as to admit a relatively tall tubular column or film of water between it and said respective cone.

2. In a gas washer, the combination of a container-vessel or casing having a gas inlet in its lower part and a gas outlet at its upper part and having a water inlet at its upper part and a water outlet at its lower part, a plurality of centrally disposed distributing means within said container-vessel or casing, and a plurality of annularly disposed collecting means arranged alternately with said distributing means, said collecting means being so shaped and dimensioned as to guide the liquid collected thereby toward the outer edges or peripheries of the respective distributing means.

3. In a gas washer the combination of a container-vessel or casing having a gas inlet in its lower part and a gas outlet in its upper part, and having a water inlet in its upper part and a water outlet in its lower part, a plurality of centrally disposed distributing means within said container-vessel or casing and a plurality of annularly disposed collecting means arranged alternately to said distributing means and having their lesser or lower diameters not substantially smaller and being respectively widely spaced from the next in order of the distributing means so that the film of water delivered by the collecting means to the respective distributing means will be of large superficial area.

4. In a gas washer, the combination of a container-vessel or casing having a gas inlet in its lower part and a gas outlet in its upper part and having a water inlet in its upper part and a water outlet in its lower part, a plurality of sets or nests of coaxial truncated cones within said container-vessel or casing, and a plurality of sets of apertured disks arranged alternately with said sets or nests of truncated cones, said sets or nests of truncated cones being widely spaced vertically from the respectively succeeding sets of disks so as to permit any water collected by said cones to fall toward but not to be guided into immediate proximity to said respectively succeeding disks.

5. In a gas washer, the combination of a container-vessel or tower having at its upper part an inlet for liquid and an outlet for gas and at its lower part an inlet for gas and an outlet for liquid, a plurality of liquid collecting devices comprising inverted truncated cones and a plurality of rotatably mounted distributing devices respectively arranged alternately to said collecting devices, the lower or smaller diameters of the collecting devices being not substantially smaller than the outer diameters of the respective distributing devices and being spaced therefrom at distances such as not materially to retard the momentum of an upward current of gas and so as to cause the descending stream of liquid to present a large superficial area to said current of gas so that said liquid may be thoroughly broken up by the momentum of the gas.

6. In a gas washer, the combination of a container-vessel or casing having a gas inlet at its lower part and a gas outlet at its upper part, and having a water inlet at its upper part and a water outlet at its lower part, a plurality of truncated cones or collecting devices, a plurality of sets of apertured disks or distributing devices arranged alternately with the cones or collecting devices, the disks or distributing devices of a set being of progressively increasing diameters as regarded in one direction of succession, and a common central support for said sets of distributing devices.

7. In a gas washer, the combination of a container-vessel or casing having a gas inlet at its lower part and a gas outlet at its upper part and having a water inlet at its upper part and a water outlet at its lower part, a plurality of truncated cones or collecting devices, a plurality of sets of apertured disks or distributing devices arranged alternately with the cones or collecting devices, the disks or distributing devices of a set being of progressively increasing diameters as regarded in one direction of succession, and a common central support for said sets of distributing devices, the disks of any set being not materially larger in diameter than the lower or smaller diameters of the respective cones.

8. In a gas washer, the combination of a container-vessel or casing having a gas inlet at its lower part and a gas outlet at its upper part and having a water inlet at its upper part and a water outlet at its lower part, a plurality of sets or nests of coaxial truncated cones or collecting devices, a plurality of sets of apertured disks or distributing devices arranged alternately with said sets or nests of cones or collecting devices, the disks or distributing devices of a set being of progressively increasing diameters as regarded in one direction of succession, and a common central support for said sets of distributing devices.

9. In a gas washer the combination of a container-vessel or casing having at its upper end a water inlet and a gas outlet and having at its lower end a water outlet and a gas inlet, a plurality of inverted truncated cones fixed at different levels within said container vessel or casing, disks arranged coaxially and alternately with said cones, each of said disks being of a diameter not substantially greater than the lower or smaller diameter of the respective cone immediately above it and being located at such a distance below said respective cone as to admit a relatively tall tubular column or film of water between it and the respective cone, and a common rotary support for said disks.

10. In a gas washer the combination of a container-vessel or casing having a gas inlet in its lower part and a gas outlet in its upper part and having a water inlet at its upper part and a water outlet at its lower part, a plurality of centrally disposed distributing means within said container-vessel or casing, a plurality of annularly disposed collecting means arranged alternately with said distributing means, said collecting means being so shaped and dimensioned as to guide the liquid collected thereby toward the outer edges or peripheries of the respective distributing means, and a central rotary support for said distributing means.

11. In a gas washer the combination of a container-vessel or casing having a gas inlet in its lower part and a gas outlet in its upper part, and having a water inlet in its upper part and a water outlet in its lower part, a plurality of centrally disposed distributing means within said container vessel or casing, a plurality of annularly disposed collecting means arranged alternately to said distributing means and having their lesser or lower diameters not substantially smaller than and being respectively widely spaced from the next in order of the distributing means so that the film of water delivered by the collecting means to the respective distributing means will be of large superficial area, and a common rotary support for said distributing means.

12. In a gas washer the combination of a container-vessel or tower having at its upper part an inlet for liquid and an outlet for gas and at its lower part an inlet for gas and an outlet for liquid, a plurality of liquid collecting devices comprising inverted truncated cones and a plurality of rotatably mounted distributing devices respectively arranged alternately to said collecting devices and spaced therefrom at distances such as not materially to retard the momentum of an upward current of gas and so as to cause the descending stream of liquid to present a large superficial area to said current of gas so that said liquid may be thoroughly broken up by the momentum of the gas, said distributing devices being respectively smaller in diameter than the lesser diameter of the corresponding cones.

In testimony whereof, I affix my signature in presence of two witnesses.

ARTHUR HENRY LYMN.

Witnesses:
ALBERT MOND,
H. D. JAMESON.